(12) United States Patent
Takeuchi et al.

(10) Patent No.: US 7,501,182 B2
(45) Date of Patent: Mar. 10, 2009

(54) LIGHT TRANSMITTING MATERIAL, STRUCTURE CONNECTING LIGHT TRANSMITTING MATERIAL AND OPTICAL DEVICE, AND METHOD FOR MANUFACTURING LIGHT TRANSMITTING MATERIAL

(75) Inventors: Osamu Takeuchi, Hamamatsu (JP); Eiji Ito, Hamamatsu (JP); Wataru Nakagi, Hamamatsu (JP)

(73) Assignee: Kurabe Industrial Co., Ltd., Hamamatsu-Shi (JP)

( * ) Notice: Subject to any disclaimer, the term of this patent is extended or adjusted under 35 U.S.C. 154(b) by 53 days.

(21) Appl. No.: 10/487,251

(22) PCT Filed: Aug. 26, 2002

(86) PCT No.: PCT/JP02/08563

§ 371 (c)(1),
(2), (4) Date: Feb. 20, 2004

(87) PCT Pub. No.: WO03/021309

PCT Pub. Date: Mar. 13, 2003

(65) Prior Publication Data

US 2004/0234714 A1 Nov. 25, 2004

(30) Foreign Application Priority Data

| Aug. 27, 2001 | (JP) | ............... 2001-256348 |
| Feb. 15, 2002 | (JP) | ............... 2002-038031 |
| May 29, 2002 | (JP) | ............... 2002-155595 |
| Jul. 3, 2002 | (JP) | ............... 2002-195159 |

(51) Int. Cl.
*B32B 27/40* (2006.01)
(52) U.S. Cl. .................................................. 428/423.1
(58) Field of Classification Search ............. 428/423.1; 385/12
See application file for complete search history.

(56) References Cited

U.S. PATENT DOCUMENTS

| 3,663,514 | A | * | 5/1972 | Campbell et al. | 528/60 |
| 3,839,491 | A | * | 10/1974 | Gamero et al. | 528/67 |
| 4,199,489 | A | * | 4/1980 | Short | 524/786 |
| 4,762,392 | A | * | 8/1988 | Yamamoto et al. | 385/128 |
| 4,806,289 | A | * | 2/1989 | Laursen et al. | 264/1.29 |
| 4,822,827 | A | * | 4/1989 | Bonk et al. | 521/170 |
| 4,826,284 | A | * | 5/1989 | Sakagami et al. | 385/123 |
| 5,485,541 | A | * | 1/1996 | Bigley et al. | 385/141 |
| 6,174,604 | B1 | * | 1/2001 | Akita et al. | 428/392 |

FOREIGN PATENT DOCUMENTS

JP 01087527 A * 3/1989

* cited by examiner

*Primary Examiner*—Thao T. Tran
(74) *Attorney, Agent, or Firm*—McGinn IP Law Group, PLLC

(57) ABSTRACT

A light transmitting material having a tubular clad material and an amorphous core material having a refractive index higher than that of the tubular clad material, characterized in that the amorphous core material comprises a polymer derived from monomers comprising a polymer polyol and a polyfunctional compound having reactivity with a hydroxyl group.

16 Claims, 8 Drawing Sheets

|  | END FACE STATE | FLEXIBILITY (mm) | INITIAL VALUES (RETENTION OF LIGHT VOLUME (%)) |
|---|---|---|---|
| EXAMPLE 1 | FLAT & SMOOTH | 85 | 32.0 |
| EXAMPLE 2 | FLAT & SMOOTH | 87 | 40.8 |
| EXAMPLE 3 | FLAT & SMOOTH | 86 | 41.2 |
| COMPARATIVE EXAMPLE 1 | UNEVENNESS, POLISH REQUIRED | 20 | 38.0 |
| COMPARATIVE EXAMPLE 2 | FLAT & SMOOTH | 75 | 24.2 |

Fig. 5

| | END FACE STATE | FLEXIBILITY (mm) | INITIAL VALUES (RETENTION OF LIGHT VOLUME (%)) | TRANSMISSION LOSS VALUE (dB/m) | HEAT RESISTANCE (CHANGE RATE OF LIGHT VOLUME (%)) |
|---|---|---|---|---|---|
| EXAMPLE 4 | FLAT & SMOOTH | 85 | 32.0 | 1.00 | 95 |
| EXAMPLE 5 | FLAT & SMOOTH | 80 | 42.4 | 0.54 | 105 |
| EXAMPLE 6 | FLAT & SMOOTH | 87 | 40.8 | 0.95 | 99 |
| EXAMPLE 7 | FLAT & SMOOTH | 86 | 41.0 | 0.83 | 101 |
| COMPARATIVE EXAMPLE 3 | UNEVENNESS, POLISH REQUIRED | 20 | 38.0 | 0.20 | INCAPABLE OF MEASUREMENT DUE TO DEFORMATION |
| COMPARATIVE EXAMPLE 4 | FLAT & SMOOTH | 75 | 24.2 | 3.74 | 99 |

Fig. 8

| | EXAMPLE 8 | EXAMPLE 9 | EXAMPLE 10 | EXAMPLE 11 | COMPARATIVE EXAMPLE 5 |
|---|---|---|---|---|---|
| END FACE STATE | FLAT & SMOOTH | FLAT & SMOOTH | FLAT & SMOOTH | FLAT & SMOOTH | UNEVENNESS, POLISH REQUIRED |
| FLEXIBILITY (mm) | 105 | 101 | 106 | 103 | 8 |

Fig. 9

| ANGLE | EXAMPLE 8 | EXAMPLE 9 | EXAMPLE 10 | EXAMPLE 11 | COMPARATIVE EXAMPLE 7 |
|---|---|---|---|---|---|
| 0° | 70.1 lx | 87.1 lx | 80.3 lx | 78.3 lx | 82.5 lx |
| 90° | 71.1 lx | 86.4 lx | 79.3 lx | 79.1 lx | 64.1 lx |
| 180° | 70.5 lx | 87.8 lx | 79.1 lx | 78.5 lx | 74.1 lx |
| 270° | 70.8 lx | 87.3 lx | 79.7 lx | 78.9 lx | 62.3 lx |

Fig. 12

| LOAD (N) | EXAMPLE 12 | EXAMPLE 13 | EXAMPLE 14 | EXAMPLE 15 | COMPARATIVE EXAMPLE 8 |
|---|---|---|---|---|---|
| 0.1 | NO REMOVAL | NO REMOVAL | NO REMOVAL | NO REMOVAL | REMOVAL AT ADHERENT FACE |
| 0.5 | NO REMOVAL | NO REMOVAL | NO REMOVAL | NO REMOVAL | |
| 1.0 | NO REMOVAL | NO REMOVAL | NO REMOVAL | NO REMOVAL | |

Fig. 13

| | EXAMPLE 12 | EXAMPLE 13 | EXAMPLE 14 | EXAMPLE 15 | COMPARATIVE EXAMPLE 10 |
|---|---|---|---|---|---|
| ILLUMINANCE (lx) | 268 | 288 | 275 | 273 | 231 |

US 7,501,182 B2

LIGHT TRANSMITTING MATERIAL, STRUCTURE CONNECTING LIGHT TRANSMITTING MATERIAL AND OPTICAL DEVICE, AND METHOD FOR MANUFACTURING LIGHT TRANSMITTING MATERIAL

TECHNICAL FIELD

The present invention relates to a light transmitting material suitable for, light signal transmission such as for in-vehicle wiring, mobile wiring and FA device wiring, optical sensors such as liquid surface level sensors or pressure sensors, image guides such as for endoscopes, light guides such as for decorative displays, home electric appliances, optical devices, outdoor signages, etc. More particularly, the present invention relates to the light transmitting material, characterized by having almost no adverse effect of decrease of light volume or increase of transmission loss value when being bent, having almost no adverse effect of decrease of light volume or increase of transmission lose value under high temperature and high humidity or in the warm water, being free from deformation when exposed in high temperature in a moment, and being capable of stably maintaining an excellent light transmitting property for a long period of time, having sufficient flexibility even if the diameter is increased. The present invention also relates to a method for manufacturing such a light transmitting material at a lower production cost.

Further, the present invention also relates to a light transmitting material (light scattering material), characterized by easy and arbitrary forming to be placed at any position because of the soft and flexible property even if the diameter is increased, having no risk of being damaged because of the good impact resistance, having almost no adverse effect of decrease of side face light emission volume under high temperature and high humidity or in the warm water, and being capable of stably maintaining an excellent side face light emission property for a long period of time. The present invention also relates to a method for manufacturing such a light transmitting material (light scattering material) at a lower production cost.

Further, the present invention also relates to a structure connecting light transmitting material and optical device. More particularly, the present invention relates to such a structure, characterized by having small adverse effect of decrease of light volume or increase of transmission loss value at the connecting part, having practically sufficient connecting strength, and having almost no adverse effect of decrease of light volume or increase of transmission lose value under high temperature and high humidity or in the warm water.

BACKGROUND ART

First, several types of conventional light transmitting material will be reviewed, which are used for the light emission at the end of these materials.

In regard to light transmitting materials capable of being used, e.g. for light signal transmission such as for in-vehicle wiring, mobile wiring and FA device wiring, optical sensors such as liquid surface level sensors or pressure sensors, image guides such as fir endoscopes, light guides such as for decorative displays, home electric appliances, optical devices, outdoor signages, etc., there have been provided several materials as below.

There has been a material, of which core material and clad material are both composed of inorganic glass material such as silica glass or multicomponent glass.

There has also been a material, of which core material and clad material are both composed of PMMA (polymethyl methacrylate) plastic material.

There has also been a material, wherein a tubular clad material having small refractive index, such as silicone polymer or fluorocarbon polymer, is used, and a plastic material such as organo-polysiloxane having higher refractive index than that of the tubular clad material and serving as a core material, is filled and hardened in that tubular clad material.

There has also been a material, wherein a tubular clad material having small refractive index, such as silicone polymer or fluorocarbon polymer, is used, and a liquid or fluid transparent material having higher refractive index than that of the tubular clad material and serving as a core material, is filled and sealed in that tubular clad material (See Japanese Unexamined Patent Publication No. Hei 11-190808).

Further, there has also been a material, of which clad material is composed of fluorocarbon polymer, etc., and of which core material is composed of polycarbonate resin or norbornene resin, etc., having higher refractive index than that of the clad material (See Japanese Unexamined Patent Publication No. 2000-275448).

However, the conventional light transmitting materials discussed as above have the allowing problems.

First, in the case of a light transmitting material of which core material and clad material are both composed of inorganic glass material, when this type of light transmitting material is used e.g. as a light guide, this material would express the good light transmitting property, having almost no decrease of light volume for a wide frequency. However, because a bundle of a large number of very thin light transmitting materials (each of which outer diameter is about 10 μm) is used as a single light transmitting material, it would require the bundling process, as well as bundling components such as bundling tubes or bundling metal fittings, which would result in higher production cost.

Second, the reference is made to a light transmitting material of which core material and clad material are both composed of PMMA, plastic material. In the case of this light transmitting material, the transmission loss value is good (about 0.2 dB/m). However, the wiring workability is poor due to insufficient flexibility, and when being bent and used, the material would present a considerable adverse effect of decrease of light volume and increase of transmission loss value, and accordingly, the using purpose of this material is considerably limited. Further, this light transmitting material is very hard, and when the end faces are merely cut, the material would present a considerable adverse effect of decrease of light volume and increase of transmission loss value, and accordingly it is necessary to polish the both end faces, which would result in higher production cost.

Third, the reference is made to a light transmitting material wherein a plastic material such as organo-polysiloxane, serving as a core material, is filled and hardened in a tubular clad material. This light transmitting material has the transmission loss value at about 1.0 dB/m and in normal state, this type of material has the good light transmission property with almost no adverse effect of decrease of light volume or increase of transmission loss value. However, the material would become clouded under high temperature and high humidity or in the warm water, and would present a considerable adverse effect of decrease of light volume and increase of transmission loss value. To cope with these problems, for example with reference to Japanese Patent No. 3024475, it has been suggested that, modified polyorgano siloxane, causing no adverse effect of decrease of light volume or increase of transmission loss value, under high temperature and high humidity or in the warm water, is used as a core material. However, the modified polyorgano siloxane is a special and very expensive material, the cost of light transmitting material would become considerably high.

Fourth, in the case of a light transmitting material wherein a liquid or fluid transparent material serving as a core material is filled and sealed in a tubular clad material, it is necessary to apply laborious end sealing process to the both ends of material, such as sealing by sealer and adhering to the clad material, or covering the clad material by metal sleeve so that the both ends of the sleeve may be tightly fastened, and consequently, the production cost would become higher. In addition, since the sealing of the both ends is required, when the material is actually used, it is impossible to cut the material at a desired length, which would result in a very limited using purpose.

Further, in the case of a light transmitting material, of which clad material is composed of fluorocarbon polymer, etc., and of which core material is composed of polycarbonate resin or norbornene resin, etc., the transmission loss value is about 1.0 dB/m. However, for the purpose of preventing from becoming clouded under high temperature and high humidity or in the warm water, as suggested in Japanese Unexamined Patent Publication No. 2000-275448, it is necessary to be provided with a double-layer structure of clad material, which would result in a higher production cost. In addition, when the material is exposed in high temperature in a moment, there would be the deformation of light transmitting material due to shrinkage or fusion thereof, which would result in a serious fault of being incapable of carrying out the function as a light transmitting material. Consequently, this material cannot be used for wiring at the places expected to become abnormal temperature.

Now, several types of conventional light transmitting material will also be reviewed, which are used for the light emission from the side of these materials.

For example, neon tubes or fluorescent tubes are used as a light source or decorative displays, home electric appliances, outdoor signages and various illumination devices. However, these devices would require high voltage, and therefore, if they are used in the water or in any water-affected place such as being exposed in the rain, there would be a risk of electric shock or electric leakage. In addition, since these tubes are made of glass and may be broken easily, which would also result in a very limited using purpose.

Therefore, recently, as the alternative material, there have been provided a various type of side-emitting optical fibers, wherein, the light is incident in at least any one end of the optical fiber, comprising a core and a clad, in the longitudinal direction, and the light is emitted in the circumferential direction (from the side face) of the core and the clad.

For example, with reference to Japanese Unexamined Patent Publication No. 2000-131529, there is provided a light transmitting tube, comprising a transparent core material, and a clad material having smaller refractive index than that of the core material, wherein scattering particles, e.g. organic polymer particles such as silicone resin particles or polystyrene resin particles metal oxide particles such as $Al_2O_3$, $TiO_2$, $SiO_2$, sulfate particles such as $BaSO_4$, and carbonate particles such as $CaCO_3$, is dispersed in the core material. According to this light transmitting tube, in regard to the core material, there has been disclosed (meth)—acrylic polymer such as methylmethacrylate (MMA), and in regard to the clad material, there has been disclosed fluorocarbon polymer such as tetrafluoroethylene-hexafluoropropylene copolymer (FEP), as preferable materials.

With reference to Japanese Unexamined Patent Publication No. 2000-321444, there is provided an optical fiber, comprising a core material made of resin, and a clad material made of resin and having smaller refractive index than that of the core material, wherein the core material is mixed with particles, of which refractive index is different from that of the core material, and of which specific gravity is between 70% and 130% of that of the core material. According to this optical fiber, in regard to the core material, there has been disclosed silicone rubber, in regard to the clad material, there has been disclosed fluorocarbon resin such as tetrafluoroethylene-hexafluoropropylene copolymer (FEP), and in regard to the particles, there has been disclosed microcapsules which will be expanded when the heat is applied thereto, as preferable materials.

However, the conventional light transmitting materials discussed as above have the following problems.

First, in the case of light transmitting tube disclosed as Japanese Unexamined Patent Publication No. 2000-131529, the wiring workability is poor due to insufficient flexibility, and when as the diameter becomes lager, it would become more difficult to place in an arbitrary form, and accordingly, the using purpose of this material is considerably limited. Further, this light transmitting tube is very hard, and when the end faces are merely cut, the material would present a considerable decrease of side face light emission volume due to the serious loss of light introduction, and accordingly it is necessary to polish at least the light incident end face, which would result in higher production cost.

Second, in the case of optical fiber disclosed as Japanese Unexamined Patent Publication No. 2000-321444, this optical fiber has a good flexibility and it is possible to place in an arbitrary form even if the diameter becomes larger. Further, in normal state, this optical fiber has a good side face light emission property, because there is almost no decrease of side face light emission volume. However, when used under high temperature and high humidity or in the warm water, the material would become clouded, which would result in considerable decrease of the side face light emission volume. To cope with this problem, for example with reference to Japanese Patent No. 3024475, it has been suggested that, modified polyorgano siloxane, causing no adverse effect of decrease of side face light emission volume, under high temperature and high humidity or in the warm water, is used as a core material. However, the modified polyorgano siloxane is a special and very expensive material, the cost of light transmitting material would become considerably high.

Now, several types of conventional structure between light transmitting material and optical device will be reviewed.

When light transmitting material is used, the technology to connect the light transmitting material with optical device is required for the purpose of improving the convenience, and various technologies have been investigated. In regard to light transmitting material and optical device, there have been investigated those comprising PMMA plastic material, or those comprising silicone polymer, etc.

For the purpose of connecting these light transmitting material with optical device there has been investigated the following methods. When connecting a light transmitting material with an optical device, both comprising PMMA plastic material, it has been investigated that, the end face of the light transmitting material is in contact with the end face of the optical device, or the each end face has been armed to be a substantially half-round section face or a predetermined length, and is in contact with each other, and thereafter, the contact face is connected by adhesive or ultrasonic welding machine. Further, reference is made to a method for connecting, in the case that one of the light transmitting material and the optical device is made of PMMA plastic material, and that the other is made of silicone polymer. In this method, it is possible to connect liquid silicone polymer before the hardening reaction with the optical device made of PMMA plastic material, in which the silicone polymer may serve as adhesive by hardening reaction itself. When connecting a light transmitting material with an optical device, both comprising silicone polymer, any of the above method may be used.

When connecting a light transmitting material with an optical device, both comprising PMMA plastic material, it is understood that, in regard to the structure of connecting part, the contact face between the core material of the light transmitting material and the core material of the optical device is not covered by the clad material of the light transmitting material. On the other hand, when connecting a light transmitting material with an optical device, any of which is made of PMMA plastic and the other of which is made of silicone polymer, or when connecting a light transmitting material with an optical device, both of which are made of silicone polymer, it is understood that, in regard to the structure of connecting part, the contact face between the core material of the light transmitting material and the core material of the optical device is covered by the clad material of the light transmitting material.

However, the conventional connecting structure discussed as above have the following problems. With reference to a combination of light transmitting material with material of optical device, firstly, when PMMA plastic material is used for both the light transmitting material and the optical device, the contact face between the core material of the light transmitting material and the core material of the optical device is not covered by the clad material of the light transmitting material, in other words, the core material and the clad material are positioned on the same plane at the contact face. Consequently, with reference to the contact face on which the scatter of light would easily occur, when the scatter of light occurs at the contact face of the core material, the scattering light at the contact face of the core material would easily go out of the contact face of the clad material, and further, the scatter of light would further occur easily at the clad material, which would enhance decrease of light volume and increase of transmission loss value.

When the contact face between the light transmitting material and the optical device is not covered by the clad material of the light transmitting material, as compared with the case in which the contact face of the clad material is not positioned on the same plane as the contact face of the core material, the contact area would become smaller, thus it is difficult to obtain the sufficient connecting strength. Further, if the sufficient flexibility is not provided for any of the light transmitting material or the optical device, or for both of them, when any force such as warping is applied thereto, it will be impossible to absorb such a warping force, etc. by any flexible part, which might cause the destruction of contact face. Consequently, it will be difficult to simply obtain practically sufficient connecting strength, and the destruction might occur easily, which would pose the problem of difficulty for practical application.

Further, in the case that one of the light transmitting material and the optical device is made of, or the both of them are made of silicone polymer, when one of them has become in contact with the other before the hardening reaction of silicone polymer, they will be connected with each other, because of the silicone polymer serving as adhesive by hardening reaction itself. This connecting structure has flexibility, thus it is possible to obtain practically sufficient connecting strength. However, when silicone polymer is used, there would be the problem of becoming clouded under high temperature and high humidity or in the warm water, which would cause the adverse effect of decrease of light volume or increase of transmission loss value, and it will be impossible to carry out the function as light transmitting material or optical device.

In the light of the above problems, it is an object of the present invention to provide a light transmitting material characterized by having almost no adverse effect of decrease of light volume or increase of transmission loss value when being bent, having almost no adverse effect of decrease of light volume or increase of transmission loss value under high temperature and high humidity or in the warm water, being free from deformation when exposed in high temperature in a moment, and being capable of stably maintaining an excellent light transmitting property for a long period of time, having sufficient flexibility even if the diameter is increased. It is also an object of the present invention to provide a method for manufacturing such a light transmitting material at a lower production cost.

Further, it is another object of the present invention to provide a light transmitting material (light scattering material), characterized by easy and arbitrary forming to be placed at any position because of the soft and flexible property even if the diameter is increased, having no risk of being damaged because of the good impact resistance, having almost no adverse effect of decrease of side face light emission volume under high temperature and high humidity or in the warm water, and being capable of stably maintaining an excellent side face light emission property for a long period of time. It is also another object of the present invention to provide a method for manufacturing such a light transmitting material (light scattering material) at a lower production cost.

Further, it is also another object of the present invention to provide a structure connecting light transmitting material and optical device, characterized by having small adverse effect of decrease of light volume or increase of transmission loss value at the connecting part, having practically sufficient connecting strength, and having almost no adverse effect of decrease of light volume or increase of transmission loss value under high temperature and high humidity or in the warm water.

DISCLOSURE OF INVENTION

To achieve the objects mentioned above, according to claim 1 of the present invention, there is provided a light transmitting material comprising, a tubular clad material, and an amorphous core material incorporated in the tubular clad material and having higher refractive index than that of the tubular clad material, characterized in that, the amorphous core material has an ingredient of at least a polymer comprising a polymer polyol and a polyfunctional compound having reactivity with a hydroxyl group.

According to claim 2 of the present invention, there is provided the light transmitting material as claimed in claim 1, characterized in that, the polyfunctional compound having reactivity with the hydroxyl group has a compound, which has isocyanate group, as an ingredient.

According to claim 3 of the present invention, there is provided the light transmitting material as claimed in claim 1, characterized in that, the polyfunctional compound having reactivity with the hydroxyl group has functional group, derived from isocyanate group.

According to claim 4 of the present invention, there is provided the light transmitting material as claimed in claim 3, characterized in that, the compound, has functional group derived from isocyanate group, including isocyanurate bond.

According to claim 5 of the present invention, there is provided the light transmitting material as claimed in any one claim of claims 1 through 4, characterized in that, the polymer polyol has a polyoxypropylene polyol as an ingredient.

According to claim 6 of the present invention, there is provided the light transmitting material as claimed in any one claim of claims 1 through 5, characterized in that, the amorphous core material having the ingredients of at least the polymer comprising the polymer polyol and the polyfunctional compound having reactivity with the hydroxyl group, at least partially incorporates a gel material.

According to claim 7 of the present invention, there is provided the light transmitting material as claimed in any one claim of claims 1 through 6, further comprising dispersed particles in the amorphous core material.

According to claim 8 of the present invention, there is provided the light transmitting material as claimed in claim 7, characterized in that, the particles have the diameter of not more than 50 μm.

According to claim 9 of the present invention, there is provided a structure connecting a light transmitting material and an optical device, of which light transmitting material is as claimed in an one claim of claims 1 through 8, and of which optical device is provided with at least a core material having higher refractive index than that of the tubular clad material of the light transmitting material, characterized in that, a contact face of the amorphous core material of the light transmitting material with the core material of the optical device is covered by the tubular clad material of the light transmitting material, and that the difference in refractive index from the core material of the optical device is within +/−0.1.

According to claim 10 of the present invention, there is provided a method for manufacturing light transmitting material, comprising steps of, filling at least a mixture of a fluid polymer polyol with a polyfunctional compound having reactivity with a hydroxyl group, in a tubular clad material; reacting the filled polymer polyol with the polyfunctional compound having reactivity with the hydroxyl group; and whereby obtaining a non-fluidized light transmitting material.

According to claim 11 of the present invention, there is provided a method for manufacturing light transmitting material, comprising steps of, filling at least, a fluid polymer polyol and a polyfunctional compound having reactivity with a hydroxyl group, and particles, in a tubular clad material; reacting the filled polymer polyol with the polyfunctional compound having reactivity with the hydroxyl group; and whereby obtaining a non-fluidized light transmitting material.

With reference to material serving as a tubular clad material according to the present invention, it is not limited as long as the material is flexible and capable of being formed into tubular shape such as plastic or elastomer. For example, the material may be polyethylene, polyamide, polyvinyl chloride, silicone resin, natural rubber, fluorocarbon polymer such as polytetrafluoroethylene (PTFE), tetrafluoroethylene-hexafluoropropylene copolymer (FEP), tetrafluoroethylene-perfluoroalkoxyethylene (PFA), polychlorotrifluoroethylene (PCTFE), tetrafluoroethylene-ethylene copolymer (ETFE), polyvinylidenefluoride, vinylidenefluoride-hexafluoropropylene copolymer; tetrafluoroethylene propylene rubber, tetrafluoroethylene-hexafluoropropylene-vinylidenefluoride copolymer (THV), polyperfluoro butenil vinyl ether, TFE-perfluoro dimethyl dioxolane copolymer, fluoroalkyl methacrylate copolymer, or fluorocarbon thermoplastic elastomer. They may be used solely, or by blending two or more materials. Among these materials, it is preferable to use FEP, PFA, vinylidenefluoride-hexafluoropropylene copolymer, THV, polyperfluoro butenil vinyl ether, TFE-perfluoro dimethyl dioxolane copolymer, and fluorocarbon thermoplastic elastomer, because of their good transparency and mechanical property.

According to the present invention, these materials are formed to be a tubular shape by known extrusion method, serving as a tubular clad material.

The core material must be made of any material of which refractive index is higher than that of the tubular clad material as discussed above. According to the present invention, polymer of a polymer polyol with a polyfunctional compound having reactivity with a hydroxyl group is used as one of the ingredients. As for polymer polyol, the example may be, polyoxypropylene polyol polyethylene glycol, polyoxyalkylene polyol such as polytetramethylene ether glycol modified polyoxyalkylene polyol such as urethane modified polyether polyol or silicone modified polyether polyol, polyether ester copolymer polyol, polycarbonate polyol, or the copolymer or mixture thereof. Among these materials, it is preferable to use polyoxypropylene polyol because of the good light transmission property under high temperature and high humidity or in the warm water.

As for a polyfunctional compound having reactivity with a hydroxyl group, the example may be, compound having N-carbonyl lactam group, halogenide, compound having isocyanate group or compound having functional group derived from isocyanate group. As for compound having isocyanate group, the example may be, aliphatic polyisocyanate, alicyclic polyisocyanate or aromatic polyisocyanate. As for compound having functional group derived from isocyanate group, the example may be, blocked isocyanate in which isocyanate has been blocked by known art such as lactam, or compound having isocyanurate in which isocyanate group has been multiplied by known art. They may be used solely, or by blending two or more materials. Among these materials, it is preferable to use compound having isocyanate group, or compound having functional group derived from isocyanate group, because of the good light transmission property under high temperature and high humidity or in the warm water. As for compound having isocyanate group, it is more preferable to use alicyclic polyisocyanate. As for compound having functional group derived from isocyanate group, it is more preferable to use that having isocyanurate bond.

According to the present invention, light transmitting material is manufactured by using the tubular clad material and the core material as discussed above, in the following method.

First, at least the polymer of a fluid polymer polyol with a polyfunctional compound having reactivity with a hydroxyl group has been filled inside the tubular clad material.

In this connection, the term "at lease" means that it is sufficient to have the polymer of the polymer polyol with the polyfunctional compound having reactivity with the hydroxyl group as one of the ingredients, and it is of course assumed that any third ingredient may be included.

In regard to the method for filling the mixture of the fluid polymer polyol with the polyfunctional compound having reactivity with the hydroxyl group inside the tubular clad material, it is possible, for example, to use vacuum pump or tube pump. In addition, as another method, it is also possible to fill the fluid core material at the same time of manufacturing the tubular clad material by extrusion method. With this method, it is possible to manufacture a long size of light transmitting material continuously.

Thereafter, the fluid polymer polyol and the polyfunctional compound having reactivity with the hydroxyl group are reacted, for example by heat, to be non-fluidized state.

In this connection, the term "non-fluidized" includes the case of solid material and the case of partially incorporating gel material. Further, according to the present invention, the term "at least partially incorporating gel material" includes three cases, i.e. the case of gel and solid materials, the case of gel and liquid materials, and the case of entirely gel material. When the part of gel material is incorporated, the transparency and flexibility will improve.

It is also possible to the part of generate gel material by introducing any third ingredient. In other words, since the third ingredient will not be reacted, that part will remain as the part of gel material.

In regard to particles according to the present invention, first, as for inorganic material, the example may be, glass particles such as silica glass or multicomponent glass, metal oxide particles such as aluminum oxide, titanium oxide, magnesium oxide, sulfate particles such as barium oxide, and carbonate particles such as calcium carbonate. As for organic material, the example may be, polymethyl methacrylate (PMMA) particles, polystyrene particles, polycarbonate particles, or particles of fluorocarbon polymer such as polytetrafluroethylene (PTFE), tetrafluoroethylene-hexafluoropropylene copolymer (FEP), tetrafluoroethylene-perfluoroalkoxyethylene (PFA), polychlorotrifluoroethylene (PCTFE), tetrafluoroethylene-ethylene copolymer, (ETFE), polyvinylidenefluoride, vinylidenefluoride-hexafluoropropylene copolymer, tetrafluoroethylene propylene rubber, tetrafluoroethylene-hexafluoropropylene-vinylidenefluoride copolymer (THV), polyperfluoro butenil vinyl ether, TFE-perfluoro dimethyl dioxolane copolymer, fluoroalkyl methacrylate copolymer, or fluorocarbon thermoplastic elastomer.

The material may be selected appropriately, by considering the structural material or non-fluidization condition of the used core material, the length of light transmitting material (light scattering material) obtained by the present invention, the side face light emission volume, the used condition, or by considering the absolute specific gravity, shape, particle diameter, density or refractive index of the particles. For example, when the particle diameter is not more than 50 µm, it is possible to maintain uniform dispersed state of particles during non-fluidization, which is preferable from the viewpoint of being able to obtain the evenness of side face light emission volume. The most important point for the selection of material is to carefully check the condition in which the uniform dispersed state of particles may be maintained.

According to the present invention, the light transmitting material (light scattering material) is manufactured by using the above structural material, in the following method. First, at least the polymer of the fluid polymer polyol with the polyfunctional compound having reactivity with the hydroxyl group, and the particles have been mixed, and the mixture is then filled inside the tubular clad material.

In this connection, the term "that least" means that it is sufficient to have mixture of the polymer of the polymer polyol with the polyfunctional compound having reactivity with the hydroxyl group and the particles as one of the ingredients, and it is of course assumed that any third ingredient may be included.

Thereafter, the polymer polyol and the polyfunctional compound having reactivity with the hydroxyl group are reacted, for example by heat, to be non-fluidized state, by maintaining the dispersed state of particles.

In regard to the method for filling the mixture of the fluid polymer polyol with the polyfunctional compound having reactivity with the hydroxyl group inside the tubular clad material, it is possible, or example, to use vacuum pump or tube pump. In addition, as another method, it is also possible to fill the mixture of polymer of the fluid polymer polyol with the polyfunctional compound having reactivity with the hydroxyl group and the particles, at the same time of manufacturing the tubular clad material by extrusion method. With this method, it is possible to manufacture a long size of light transmitting material (light scattering material) continuously.

An optical device, used for the present invention, has a light transmitting property, and is at least provided with a core material, and is a structural member connected to a light transmitting material. The core material of the optical device is not limited, as long as the refractive index thereof is higher than the refractive index of the tubular clad material of the light transmitting material, and the difference in the refractive index from the core material of the light transmitting material is not more than +/−0.1, and not being the fluid state at normal temperature. For example, the substantially same material as that of the core material of light transmitting material as discussed above, PMMA polymer, styrol polymer, carbonate polymer polyolefin polymer, polyamide polymer, polyimide polymer, fluorocarbon polymer, may be used. They may be used solely, or by blending two or more materials. Among these materials, it is preferable to use the substantially same material as that of the core material of light transmitting material, PMMA polymer and carbonate polymer, because of their good transparency and cost-effectiveness. In this regard, if the difference in the refractive index between the core material of the light transmitting material and the core material of the optical device is more than +/−0.1, when the light is incident in the contact face, the light may go out of the tubular clad material easily, which would cause adverse effect of decrease of light volume or increase of transmission loss value. Thus, for the purpose of maintaining the practically sufficient property, the difference in refractive index of materials between the core material of light transmitting material and the core material of optical device must be within +/−0.1.

Preferably, a light scattering function may be applied to the optical device, by dispersing the particles as discussed above.

The shape of optical device may be, for example, rod shape, cap shape, or branch or connect shape such as Y-letter shape. The manufacturing method for this optical device may be, for example, forming by casting, injection, cutting or extrusion. It is also possible to use the light transmitting material discussed above, as the optical device.

There is an example of connecting a light transmitting material with an optical device as follows. A recessed part is formed by partially or wholly drilling the core material of light transmitting material, into which a liquid core material serving as an adhesive is poured. There is a partially or wholly protruding cylindrical shape of optical device or core material of light transmitting material, which has been inserted into the recessed part, thereafter the liquid core material is hardened by e.g. heat, so that the light transmitting material may be connected with the optical device. Further, before the mixture of the fluid polymer polyol with the polyfunctional compound having reactivity with the hydroxyl group is filled in the clad material to be hardened, the cylindrical shape of optical device has been inserted in advance, and thereafter, the mixture of the fluid polymer polyol with the polyfunctional compound having reactivity with the hydroxyl group is reacted to be hardened by e.g. heat, whereby the connecting structure may be obtained, in which the mixture of the fluid polymer polyol with the polyfunctional compound having reactivity with the hydroxyl group serves as an adhesive. In regard to the structure connecting the light transmitting material and the optical device, which have been manufactured according to the method as discussed above, the contact face between the core material of the light transmitting material and the core material of the optical device is covered by the clad material of the light transmitting material.

Since the contact face between the light transmitting material and the optical device has been covered by the tubular clad material of the light transmitting material, with reference to the contact face on which the scatter of light would easily occur, even when the scatter of light occurs at the contact face of the core material, as long as the contact face of the tubular clad material is not on the same plane as that of the contact face of the core material, it is possible to prevent the scattering light at the contact face of the core material from being reflected by the tubular clad material, and further prevent the scattering light from going out of the clad material, whereby further scattering of light at the tubular clad part may be minimized, thus it is possible to prevent any adverse effect such as decrease of light volume and increase of transmission loss value.

Where the contact face between the light transmitting material and the optical device is covered by the clad material of the light transmitting material, as compared with the case in which the contact face of the clad material is positioned on the same plane as the contact face of the core material, the contact area may become larger, thus it is possible to obtain the sufficient connecting strength. Further, if the sufficient flexibility is provided for any of the light transmitting material or the optical device, or for both of them, when any force such as warping is applied thereto, it is possible to absorb such a warping force, etc. by any flexible part, whereby the destruction of contact face may be prevented.

The structure connecting light transmitting material and optical device as discussed above, using the tubular clad material and the core material, has several merits, such as the less adverse effect of decrease of light volume or increase of transmission loss value at the connecting part, the practically sufficient contact strength, and almost no adverse effect of decrease of light volume or increase of transmission loss value, under high temperature and high humidity, or in the warm water

BRIEF DESCRIPTION OF DRAWINGS

FIG. 5 is a comparative table of examples, with comparative examples according to a second embodiment of the present invention;

FIG. 8 is a comparative table of examples with a comparative example according to a third embodiment of the present invention;

FIG. 9 is a comparative table of examples with a comparative example according to the third embodiment of the present invention;

FIG. 12 is a comparative table of examples with a comparative example according to a fourth embodiment of the present invention;

FIG. 13 is a comparative table of examples with a comparative example according to the fourth embodiment of the present invention;

BEST MODE FOR CARRYING OUT THE INVENTION

Figures 1, 2:
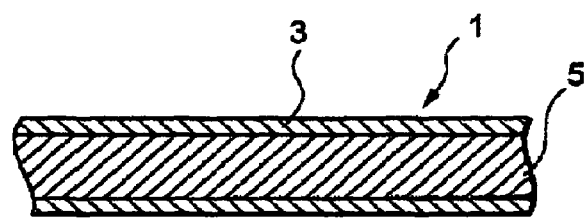
FIG. 1 is a partial section view of a light transmitting material according to a first embodiment of the present invention.
FIG. 2 is a comparative table of examples with comparative examples according to the first embodiment of the present invention.
Figure 3:
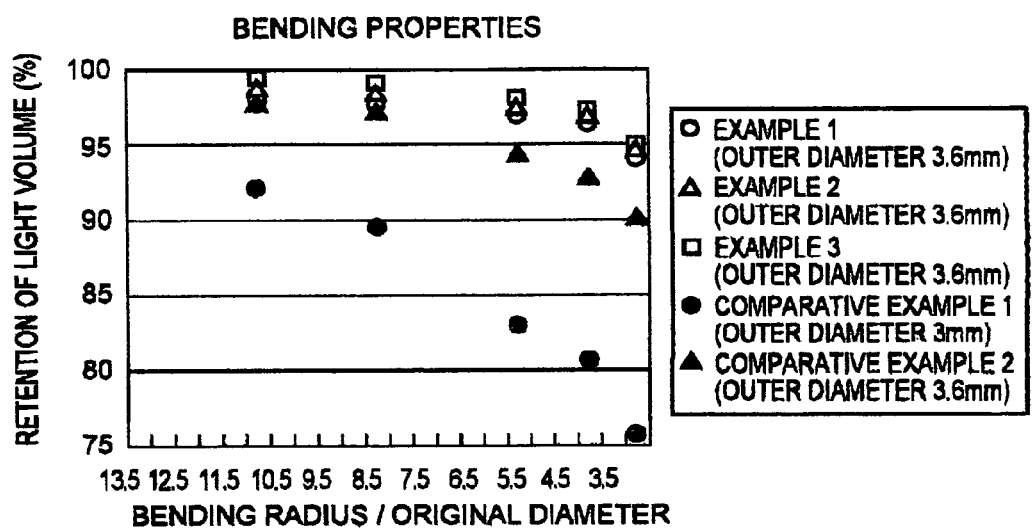
FIG. 3 is a graphic chart, showing a result of bending property test according to the first embodiment of the present invention.
Figure 4:
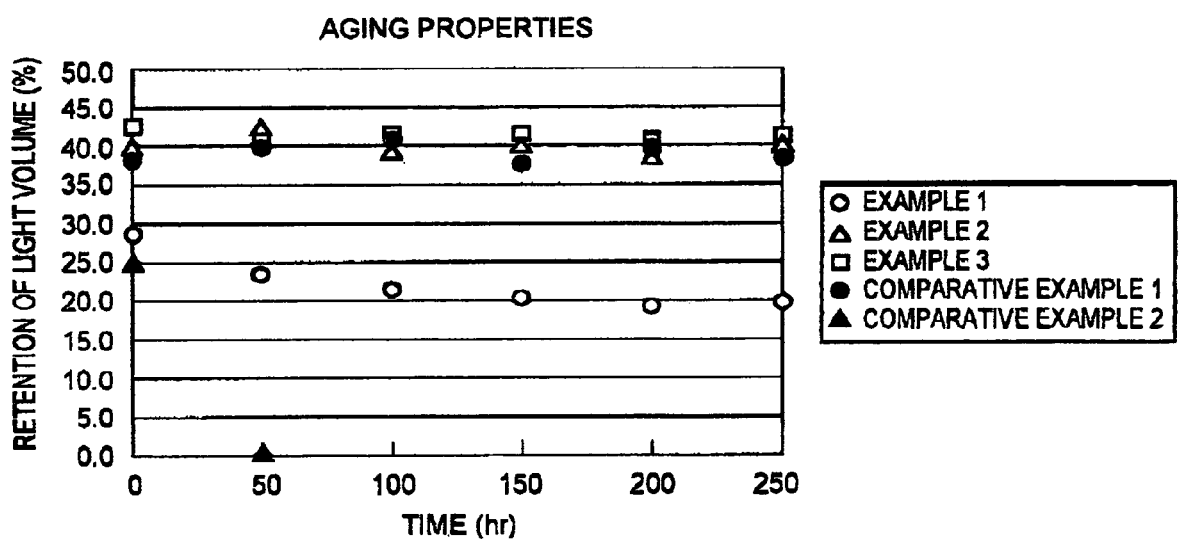
FIG. 4 is a graphic chart, showing a result of aging properties test according to the first embodiment of the present invention.

A first embodiment of the present invention will be explained with reference to FIGS. 1 through 4. The first embodiment will be shown by "Example 1", "Example 2" and "Example 3" as discussed below.

First, before explaining each example, the fundamental structure of a light transmitting material 1 according to the present embodiment will be explained with reference to FIG. 1. The light transmitting material 1 is comprising a tubular clad material 3, and a core material 5 which has been incorporated and placed inside the tubular clad material 3.

EXAMPLE 1

As a polymer polyol serving as the core material 5, 10 g of polyoxypropylene triol and 10 g of polyoxypropylene diol were used, and as a polyfunctional compound having reactivity with a hydroxyl group, 20 g of hexamethylene diisocyanate was used. Further, as a tube serving as the tubular clad material 3, an FEP tube of which outer diameter was 3.6 mm and of which length was 1.3 m was used. The mixture of the above core material 5 was filled in the above tubular clad material 3, and hardened by heat at 90° C., and thereafter, the both ends were cut, whereby the light transmitting material 1, having the length of 1 m, could be obtained.

EXAMPLE 2

As a polymer polyol serving as the core material 5, 10 g of polyoxypropylene triol and 10 g of polyoxypropylene diol were used, and as a polyfunctional compound having reactivity with a hydroxyl group having isocyanurate bond, 20 g of Coronate HX (manufactured by Nippon Polyurethane Industry Co., Ltd.) was used. Further, as a tube serving as the tubular clad material 3, an FEP tube of which outer diameter was 3.6 mm and of which length was 1.3 m was used. The mixture of the above core material 5 was filled in the above tubular clad material 3, and hardened by heat at 90° C., and thereafter, the both ends were cut, whereby the light transmitting material 1, having the length of 1 m, could be obtained.

EXAMPLE 3

As a polymer polyol serving as the core material 5, 20 g of polyoxypropylene triol was used, and as a polyfunctional compound having reactivity with a hydroxyl group having isocyanurate bond, 20 g of Coronate HX (manufactured by Nippon Polyurethane Industry Co., Ltd.) was used. Further, as a tube serving as the tubular clad material 3, an FEP tube of which outer diameter was 3.6 mm and of which length was 1.3 m was used. The mixture of the above core material 5 was filled in the above tubular clad material 3, and hardened by heat at 90° C., and thereafter, the both ends were cut, whereby the light transmitting material 1, having the length of 1 m, could be obtained.

Then, for the purpose of making comparison with these examples 1, 2 and 3, the explanation will be done in regard to "comparative example 1" and "comparative example 2".

COMPARATIVE EXAMPLE 1

A commercial light transmitting material, of which core material and tubular clad material were both made of PMMA plastic material, and of which outer diameter was 3 mm and of which length was 1.3 m, was provided, and the both ends were cut, whereby the commercial light transmitting material, having the length of 1 m, could be obtained.

COMPARATIVE EXAMPLE 2

As a core material, a commercial two-liquid mixture type of polyorgano siloxane was used, and as a tube serving as the tubular clad material, an FEP tube of which outer diameter was 3.6 mm and of which length was 1.3 m was used. The above core material was filled in the above tubular clad material, and hardened by heat, and thereafter, the both ends were cut, whereby the light transmitting material having the length of 1 m could be obtained.

For the purpose of estimating the properties of the light transmitting material 1 according to examples 1, 2 and 3, the following experiments were conducted.

Examination of End Face States:

The cut faces of the both ends of each sample were examined by visual observation. The result is as per shown in FIG. 2.

Flexibilities:

One end of the light transmitting material 1, having the length of 100 mm, was fixed to be in the horizontal state, at which a 50 g of weight was suspended. Thus, the bent length against the horizontal surface was measured. The result is as per shown in FIG. 2.

Light Transmitting Properties:

(A) Initial Values:

The retention of light volume of each sample was measured, by placing each sample linearly. The retention of light volume was calculated by using the following formula, after measuring the light volume emitting out of a white LED, and also measuring the light volume emitting out of one end of the light transmitting material 1 as the subject of measurement, when the white LED was incident in the other end thereof, by using an illuminometer:

[Retention of light volume (%)=Light volume emitting out of light transmitting material/Light volume of LED×100]

The result is as per shown in FIG. 2.

(B) Bending Properties:

Each sample was bent to become a half circle, of which radius was 13.6-3.5 times as large as that of the original diameter, and the retention of light volume was measured. Thereafter, the rate of change, from the original retention of light volume which had been obtained by the above initial value test, was calculated. The result is as per shown in FIG. 3.

(C) Aging Properties:

Each sample was left in a high-temperature and high-humidity bath at 80° C. and 95% for a predetermined time. Thereafter, the sample was collected and left at room temperature for 30 minutes, and the change of retention of light volume due to the change of time was measured in that state. The result is as per shown in FIG. 4.

According to the results of the above test, the following points were found: First, as for the end face states, with regard to the light transmitting material 1 according to the examples 1, 2 and 3, the cut face was flat and smooth, and no polishing of the end face was required. On the other hand, the light transmitting material according to the comparative example 1 had unevenness, thus the polishing for 20 seconds were required.

Second, as for the flexibilities, each of the examples 1, 2 and 3 had the remarkable excellent flexibility as compared with the comparative example 1.

Third, as for the initial values, according to the examples 1, 2 and 3, each had the excellent retention of light volume. In particular, the examples 2 and 3, for which the polyfunctional compound having reactivity with the hydroxyl group having isocyanurate bond was used as that serving as the core material 5, respectively indicated especially excellent retention of light volume.

Fourth, as for the bending properties, each of the examples 1, 2 and 3 had the remarkable excellent retention of light volume as compared with the comparative examples 1 and 2.

Fifth, as for the aging properties, according to the examples 1, 2 and 3, there was almost no decrease of light volume under high temperature and high humidity, and the excellent light transmitting property could be stably maintained for a long period of time. In particular, the examples 2 and 3, for which the polyfunctional compound having reactivity with the hydroxyl group having isocyanurate bond was used as that serving as the core material 5, respectively indicated especially excellent aging properties.

According to this embodiment of the present invention as discussed above in detail, there is almost no decrease of light volume due to being bent, and almost no decrease of light volume under high temperature and high humidity, and the excellent light transmitting property may be stably maintained for a long period of time, and it is possible to obtain the light transmitting material 1, having a sufficient flexibility even when the diameter is enlarged. Further, it is also possible to provide a method for manufacturing light transmitting material, in which the light transmitting material 1 may be manufactured at a lower cost.

Figure 6:
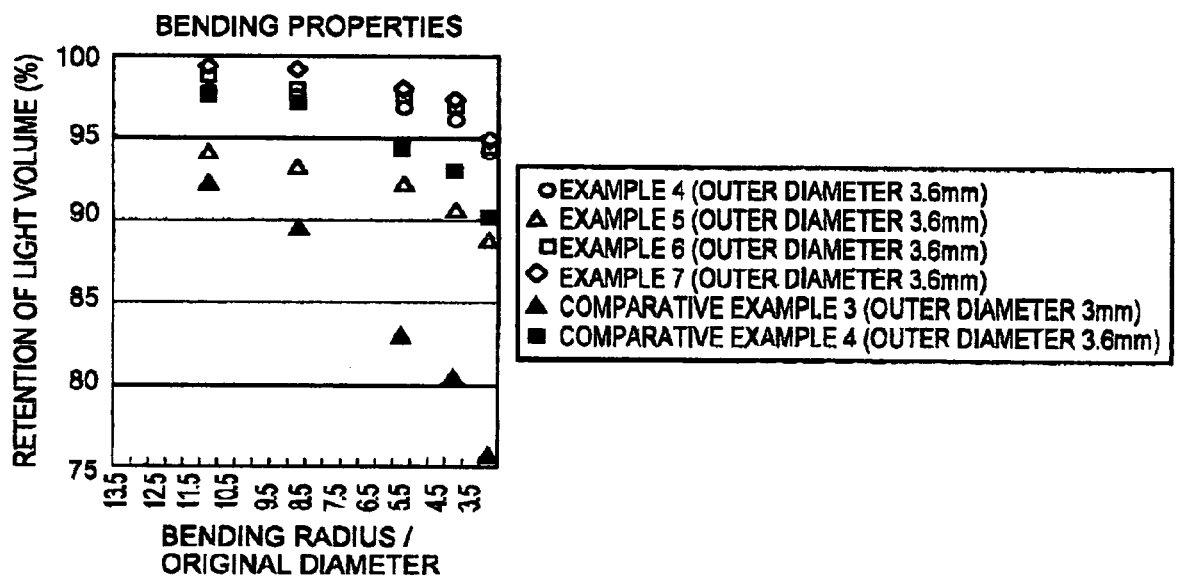
FIG. 6 is a graphic chart, showing a result of bending property test according to the second embodiment of the present invention.
Figure 7:
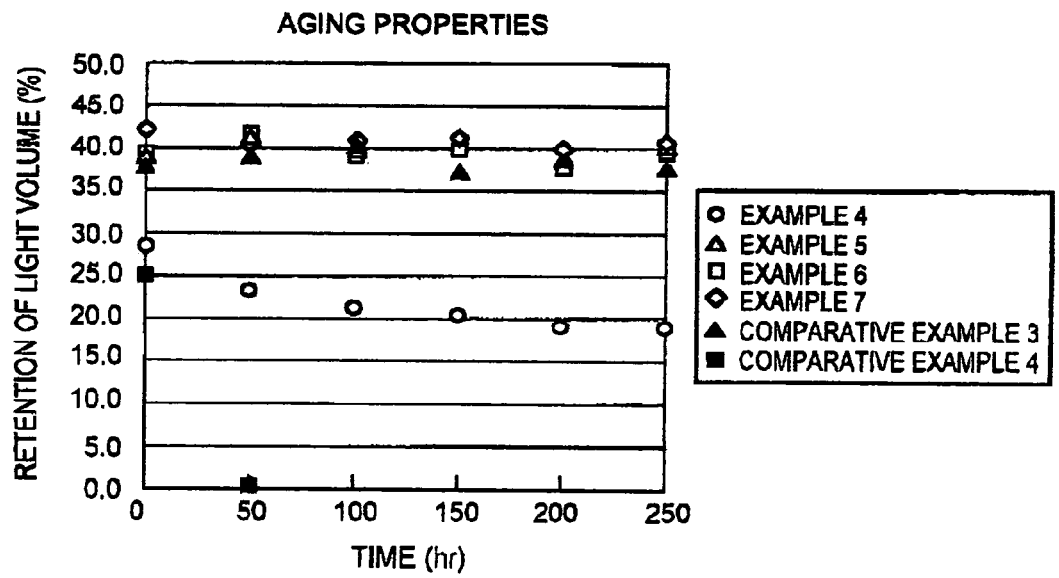
FIG. 7 is a graphic chart, showing a result of aging properties test according to the second embodiment of the present invention.
Figure 10:
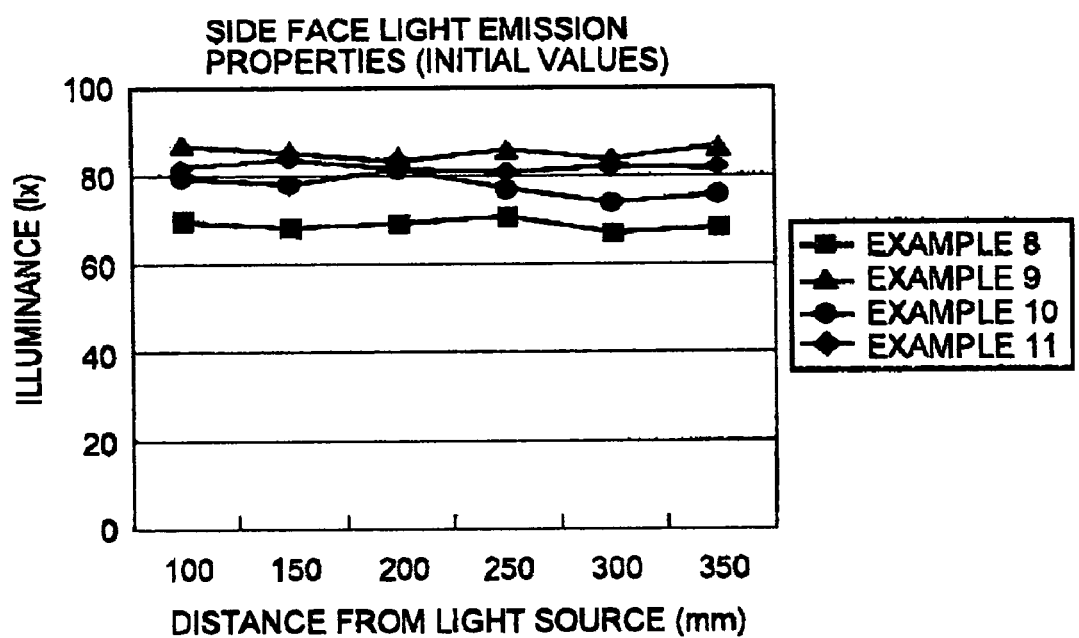
FIG. 10 is a graphic chart, showing side face light emission properties (initial values) of the light transmitting material (light scattering material) according to the third embodiment of the present invention.
Figure 11:
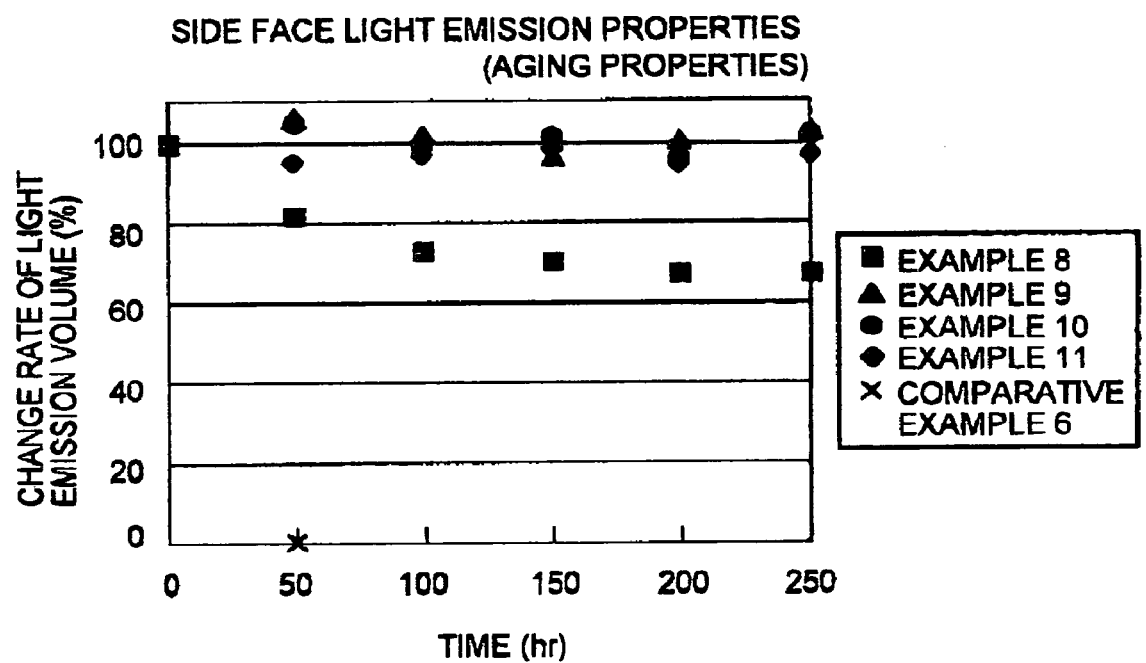
FIG. 11 is a graphic chart, showing side face light emission properties (aging properties) of the light transmitting material (light scattering material) according to the third embodiment of the present invention.

Now, a second embodiment of the present invention will be explained with reference to FIGS. 5 through 7. The second embodiment will be shown by "Example 4", "Example 5", "Example 6" and "Example 7" as discussed below.

For reference, as the fundamental structure of the light transmitting material 1 is substantially the same as that of the first embodiment discussed above, the identical signs and numerals will be used for the identical parts.

EXAMPLE 4

As a polymer polyol serving as the core material 5, 10 g of polyoxypropylene triol and 10 g of polyoxypropylene diol were used, and as a polyfunctional compound having reactivity with a hydroxyl group, 20 g of hexamethylene diisocyanate was used. Further, as a tube serving as the tubular clad material 3, an FEP tube of which outer diameter was 3.6 mm was used. The mixture of the above core material 5 was filled in the above tubular clad material 3, and hardened by heat at 90° C., and thereafter, the both ends were cut, whereby the light transmitting material 1 could be obtained.

For reference, the example 4 is equivalent to the example 1 of the first embodiment of the present invention.

EXAMPLE 5

As a polymer polyol serving as the core material 5, 12 g of polyoxypropylene triol and 12 g of polyoxypropylene diol were used, and as a polyfunctional compound having reactivity with a hydroxyl group, 13 g of Cosmonate NBDI (manufactured by Mitsui Takeda Chemicals, Inc.) was used. Further, as a tube serving as the tubular clad material 3, an FEP tube of which outer diameter was 3.6 mm was used. The mixture of the above core material 5 was filled in the above tubular clad material 3, and hardened by heat at 90° C., and thereafter, the both ends were cut, whereby the light transmitting material 1 could be obtained.

EXAMPLE 6

As a polymer polyol serving as the core material 5, 10 g of polyoxypropylene triol and 10 g of polyoxypropylene diol were used, and as a polyfunctional compound having reactivity with a hydroxyl group having isocyanurate bond, 20 g of Coronate HX (manufactured by Nippon Polyurethane Industry Co., Ltd.) was used. Further, as a tube serving as the tubular clad material 3, an FEP tube of which outer diameter was 3.6 mm was used. The mixture of the above core material 5 was filled in the above tubular clad material 3, and hardened by heat at 90° C., and thereafter, the both ends were cut, whereby the light transmitting material 1 could be obtained.

For reference, the example 6 is equivalent to the example 2 of the first embodiment of the present invention.

EXAMPLE 7

As a polymer polyol serving as the core material 5, 20 g of polyoxypropylene triol was used, and as a polyfunctional compound having reactivity with a hydroxyl group having isocyanurate bond, 20 g of Coronate HX (manufactured by Nippon Polyurethane Industry Co., Ltd.) was used. Further, as a tube serving as the tubular clad material 3, an FEP tube of which outer diameter was 3.6 mm was used. The mixture of the above core material 5 was filled in the above tubular clad material 3, and hardened by heat at 90° C., and thereafter, the both ends were cut, whereby the light transmitting material 1 could be obtained.

For reference, the example 7 is equivalent to the example 3 of the first embodiment of the present invention.

COMPARATIVE EXAMPLE 3

A commercial light transmitting material of which core material and clad material were both made of PMMA plastic material, and of which outer diameter was 3 mm, was provided, and the both ends were cut, whereby the commercial light transmitting material could be obtained.

For reference, the comparative example 3 is equivalent to the comparative example 1 of the first embodiment of the present invention.

COMPARATIVE EXAMPLE 4

As a core material a commercial two-liquid mixture type of polyorgano siloxane was used, and as a tube serving as the tubular clad material, an FEP tube of which outer diameter was 3.6 mm was used. The above core material was filled in the above tubular clad material, and hardened by heat, and thereafter, the both ends were cut, whereby the light transmitting material could be obtained.

For reference, the comparative example 4 is equivalent to the comparative example 2 of the first embodiment of the present invention.

For the purpose of estimating the properties of the light transmitting material 1 according to examples 4, 5, 6 and 7, the following experiments were conducted.

Examination of End Face States:

The cut faces of the both ends of each sample were examined by visual observation. The result is as per shown in FIG. 5.

Flexibilities:

One end of the light transmitting material 1, having the length of 100 mm, was fixed to be in the horizontal state, at which a 50 g of weight was suspended. Thus, the bent length against the horizontal surface was measured. The result is as per shown in FIG. 5.

Light Transmitting Properties:

(A) Initial Values:

The retention of light volume of each sample, respectively having the length of 1 m, was measured, by placing each sample linearly. The retention of light volume was calculated by using the following formula, after measuring the light volume emitting out of a white LED, and also measuring the light volume emitting out of one end of the light transmitting material 1 as the subject of measurement, when the white LED was incident in the other end thereof, by using an illuminometer:

[Retention of light volume (%)=Light volume emitting out of light transmitting material/Light volume of LED×100]

The result is as per shown in FIG. 5.

(B) Transmission Loss Values:

The transmission loss value of each sample was measured according to 3 m-1 m cut back method, by using a white LED as a light source, the result is as per shown in FIG. 5.

(C) Heat Resistances

Each sample was left in a constant temperature bath at 200° C. for 1 minute. Thereafter, the sample was collected and left at room temperature for 30 minutes, and the change of retention of light volume was measured, by calculation according to the following formula:

[Change rate of light volume (%)=Light volume after test/Light volume before test×100]

The result is as per shown in FIG. 5.

(D) Bending Properties:

Each sample was bent to become a half circle, of which radius was 13.5-3.5 times as large as that of the original diameter, and the retention of light volume was measured. Thereafter, the rate of change, from the original retention of light volume which had been obtained by the above initial value test, was calculated. The result is as per shown in FIG. 6.

(E) Aging Properties:

Each sample was left in the warm water at 60° C. for a predetermined time. Thereafter, the sample was collected and left at room temperature for 30 minutes, and the change of retention of light volume due to the change of time was measured in that state. The result is as per shown in FIG. 7.

According to the results of the above test, the following points were found: First, as for the end face states, with regard to the light transmitting material 1 according to the examples 4, 5, 6 and 7, the cut face was flat and smooth, and no polishing of the end face was required. On the other hand, the light transmitting material according to the comparative example 3 had unevenness, thus the polishing or 20 seconds were required.

Second, as for the flexibilities, each of the examples 4, 5, 6 and 7 had the remarkable excellent flexibility as compared with the comparative example 3.

Third, as for the initial values, according to the examples 4, 5, 6 and 7, each had the excellent retention of light volumes. In particular, the example 5, for which alicyclic polyisocyanate was used as the polyfunctional compound having reactivity with the hydroxyl group serving as the core material 5, and the examples 6 and 7, for which the polyfunctional compound having reactivity with the hydroxyl group, having isocyanurate bond was used as that serving as the core material 5, respectively indicated especially excellent retention of light volume.

Fourth, as for the transmission loss values, according to the examples 4, 5, 6 and 7, each had the value of not more than 1.0 dB/m, thus showing the sufficient light transmitting properties. In particular, the example 5, for which alicyclic polyisocyanate was used as the polyfunctional compound having reactivity with the hydroxyl group, serving as the core material 5, and the examples 6 and 7, for which the polyfunctional compound having reactivity with the hydroxyl group, having isocyanurate bond was used as that serving as the core material 5, respectively indicated especially excellent transmission loss value.

Fifth, as for the heat resistances, according to the examples 4, 5, 6 and 7, none of them showed the deformation, and there was almost no decrease of light volume.

Sixth, as for the bending properties, each of the examples 4, 5, 6 and 7 had the excellent retention of light volume as compared with the comparative example 3.

Seventh, as for the aging properties, according to the examples 4, 5, 6 and 7, there was almost no decrease of light volume in the warm water, and the excellent light transmitting property could be stably maintained for a long period of time. In particular, the example 6, for which alicyclic polyisocyanate was used as the polyfunctional compound having reactivity with the hydroxyl group, serving as the core material 6, and the examples 6 and 7, for which the polyfunctional compound having reactivity with the hydroxyl group, having isocyanurate bond was used as that serving as the core material 5, respectively indicated especially excellent aging properties.

According to this embodiment of the present invention as discussed above in detail, there is almost no decrease of light volume or increase of transmission loss value due to being bent, and almost no decrease of light volume or increase of transmission loss value, under high temperature and high humidity, or in the warm water, no risk of deformation when exposed in high temperature in a moment, and the excellent light transmitting property may be stably maintained for a long period of time, and it is possible to obtain the light transmitting material, having a sufficient flexibility even when the diameter is enlarged. Further, it is also possible to provide a method for manufacturing light transmitting material, in which the light transmitting material may be manufactured at a lower cost.

Now, a third embodiment of the present invention will be explained with reference to FIGS. 8 through 11. The third embodiment will be shown by "Example 8", "Example 9", "Example 10" and "Example 11" as discussed below.

For reference, as the fundamental structure of the light transmitting material (light scattering material) is substantially the same as those of the first and second embodiments discussed above, the identical signs and numerals will be used for the identical parts.

EXAMPLE 8

As a polymer polyol serving as the core material 5, 10 g of polyoxypropylene triol and 10 g of polyoxypropylene diol were used. As a polyfunctional compound having reactivity with a hydroxyl group, 20 g of hexamethylene diisocyanate was used. As a tube serving as the tubular clad material 3, an FEP tube of which outer diameter was 10.6 mm was used. Further, as for particles, 0.01 g of glass beads, each of which average diameter was 5 µm, were used. The mixture of the fluid polymer polyol and the polyfunctional compound having reactivity-with the hydroxyl group, with the particles, was filled in the above tubular clad material 3, and non-fluidized by heat at 100° C., and thereafter, the both ends were cut, whereby the light transmitting material (light scattering material) 1 could be obtained.

EXAMPLE 9

As a polymer polyol serving as the core material 5, 12 g of polyoxypropylene triol and 12 g of polyoxypropylene diol were used. As a polyfunctional compound having reactivity with a hydroxyl group, 13 g of Cosmonate NBDI (manufactured by Mitsui Takeda Chemicals, Inc.) was used. As a tube serving as the tubular clad material 3, an FEP tube of which outer diameter was 10.6 mm was used. Further, as for particles, 0.01 g of glass-beads, each of which average diameter was 5 µm, were used. The mixture of the fluid polymer polyol and the polyfunctional compound having reactivity with the hydroxyl group, with the particles, was filled in the above tubular clad material 3, and non-fluidized by heat at 100° C., and thereafter, the both ends were cut, whereby the light transmitting material (light scattering material) 1 could be obtained.

EXAMPLE 10

As a polymer polyol serving as the core material 5, 10 g of polyoxypropylene triol and 10 g of polyoxypropylene diol were used. As a polyfunctional compound having reactivity with a hydroxyl group, having isocyanurate bond, 20 g of Coronate HX (manufactured by Nippon Polyurethane Industry Co., Ltd.) was used. As a tube serving as the tubular clad material 3, an FEP tube of which outer diameter was 10.6 mm was used. Further, as for particles, 0.01 g of glass beads, each of which average diameter was 5 µm, were used. The mixture of the fluid polymer polyol and the polyfunctional compound having reactivity with the hydroxyl group, with the particles, was filled in the above tubular clad material 3, and non-fluidized by heat at 100° C., and thereafter, the both ends were cut, whereby the light transmitting material (light scattering material) 1 could be obtained.

EXAMPLE 11

As a polymer polyol serving as the core material 5, 20 g of polyoxypropylene triol was used, and as a polyfunctional compound having reactivity with a hydroxyl group having isocyanurate bond, 20 g of Coronate HX (manufactured by Nippon Polyurethane Industry Co., Ltd.) was used. As a tube serving as the tubular clad material 3, an FEP tube of which outer diameter was 10.6 mm was used. Further, as for particles, 0.01 g of glass beads, each of which average diameter was 5 µm, were used. The mixture of the fluid polymer polyol and the polyfunctional compound having reactivity with the hydroxyl group, with the particles, was filled in the above tubular clad material 3, and non-fluidized by heat at 100° C., and thereafter, the both ends were cut, whereby the light transmitting material (light scattering material) 1 could be obtained.

COMPARATIVE EXAMPLE 5

As for core material, a PMMA plastic material was used. As for clad material, an FEP tube of which outer diameter was 10.6 mm as used. Further, as for particles, 0.01 g of glass beads, each of which average diameter was 5 µm, were used. The mixture of the core material with the particles was filled in the above tube, and hardened by heat, and thereafter, the both ends were cut, whereby the light transmitting material (light scattering material) could be obtained.

COMPARATIVE EXAMPLE 6

As a core material, a commercial two-liquid mixture type of polyorgano siloxane was used. As a clad material, an FEP tube of which outer diameter was 10.6 mm was used. Further, as for particles, 0.01 g of glass beads, each of which average diameter was 5 µm, were used. The mixture of the core material with the particles was filled in the above tube, and hardened by heat, and thereafter, the both ends were cut, whereby the light transmitting material (light scattering material) could be obtained.

COMPARATIVE EXAMPLE 7

The structure was substantially the same as that of the example 10, except for particles, for which 0.01 g of glass beads, each of which average diameter was 70 µm, were used. Thus the light transmitting material (light scattering material) could be obtained.

For the purpose of estimating the properties of the light transmitting material (light scattering material) 1 according to examples 8, 9, 10 and 11, the following experiments were conducted.

Examination of End Face States:

The cut faces of the both ends of each light transmitting material (light scattering material) 1 were examined by visual observation. The result is as per shown in FIG. 8.

Flexibilities:

One end of the light transmitting material (light scattering material) 1, having the length of 200 mm, was fixed to be in the horizontal state, at which a 200 g of weight was suspended. Thus, the bent length against the horizontal surface was measured. The result is as per shown in FIG. 8.

Side Face Light Emission Properties:

(A) Initial Values:

The side face light emission volume of each sample, respectively having the length of 0.4 m, was measured, by placing each sample linearly. A white LED serving as a light source was used as the 0-point, thus the side face light emission volume was obtained, by measuring the side face light emission volume at a predetermined position, by using an illuminometer. The result is as per shown in FIG. 10.

(B) Uniformities:

The side face light emission volumes of each sample, respectively having the length of 0.4 m, were measured, by placing each sample linearly A white LED serving as a light source was used as the 0-point, thus the side face light emission volumes were obtained, by measuring the side face light emission volumes on the same circumferential face at angles from 0° to 270°, by every angle of 90°, from the distance of 200 mm, by using an illuminometer. The result is as per shown in FIG. 9.

(C) Aging Properties:

Each sample, having the length of 0.4 mm, was left in the warm water at 60° C. for a predetermined time. Thereafter, the sample was collected and left at room temperature for 30 minutes. Then the each sample was placed linearly, and the change rate of light emission volume, in regard to the side face light emission volume, was measured in that state. The change rate of light emission volume was calculated, by measuring the side face light emission volume at the position 200 mm away from a white LED serving as a light source placed at the 0-point, by using an illuminometer. The result is as per shown in FIG. 11.

According to the results of the above test, the following points were found: First, as for the end face states, with regard to the light transmitting material. (light scattering material) 1 according to the examples 8, 9, 10 and 11, the cut face was flat and smooth, and no polishing of the end face was required. On the other hand, the light transmitting material (light scattering material) according to the comparative example 5 had unevenness, thus the polishing for 20 seconds were required.

Second, as fox the flexibilities, each of the examples 8, 9, 10 and 11 had the remarkable excellent flexibility as compared with the comparative example 5.

Third, as for the side face light emission properties (initial values), according to the examples 8, 9, 10 and 11, each had the excellent side face light emission volume irrespective of the distance from the light source, and showed the excellent side face light emission property. In particular, the example 9, for which alicyclic polyisocyanate was used as the polyfunctional compound having reactivity with the hydroxyl group, serving as the core material, and the examples 10 and 11, for which the polyfunctional compound having reactivity with the hydroxyl group, having isocyanurate bond was used as that serving as the core material, respectively indicated especially excellent side face light emission property.

Fourth, as for the uniformities, according to the examples 8, 9, 10 and 11, each had the uniform side face emission volume on the same circumferential face. On the other hand, as for the comparative example 7, of which particle diameter exceeded the upper limit of preferable range (50 µm), the uniform side face light emission volume could not be obtained on the same circumferential face.

Fifth, as for the side face light emission properties (aging properties), according to the examples 8, 9, 10 and 11, there was almost no decrease of side face light emission volume in the warm water, and the excellent side face light emission property could be stably maintained for a long period of time. In particular, the example 9, for which alicyclic polyisocyanate was used as the polyfunctional compound having reactivity with the hydroxyl group, serving as the core material 5, and the examples 10 and 11, for which the polyfunctional compound having reactivity with the hydroxyl group, having isocyanurate bond was used as that serving as the core material, respectively indicated especially excellent aging properties. On the other hand, with regard to the comparative example 6 in which a polyorgano siloxane was used as the core material, the material become clouded after 50 hours, and it became impossible to measure the measurement of aide face light emission volume.

According to this embodiment of the present invention as discussed above in detail, it is possible to provide a light transmitting material (light scattering material), which can be formed and placed at any arbitrary position easily, because of the soft and flexible property thereof, even if the diameter is increased, which has no risk of being damaged because of the good impact resistance, which almost has no adverse effect of decrease of side face light emission volume under high temperature and high humidity or in the warm water, and which is capable of stably maintaining an excellent side face light emission property for a long period of time, at a lower production cost.

Now, a fourth embodiment of the present invention will be explained with reference to FIGS. through 12 and 15. The fourth embodiment will be shown by "Example 12", "Example 13", "Example 14" and "Example 15" as discussed below.

For reference, as the fundamental structure of the light transmitting material 1 is substantially the same as those of the first through third embodiments discussed above, the identical signs and numerals will be used for the identical parts.

EXAMPLE 12

Figure 14:
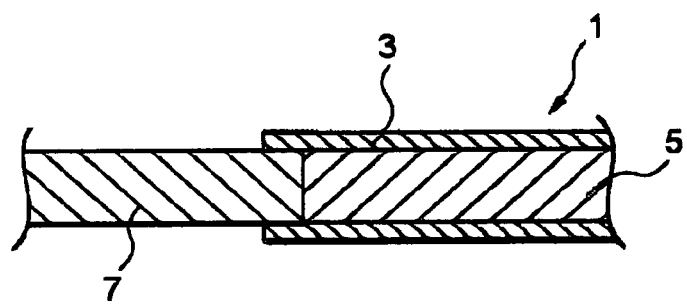
FIG. 14 is a view showing a structure of connecting part between a light transmitting material and an optical device according to the fourth embodiment of the present invention.

As illustrated in FIG. 14, as a polymer polyol serving as the core material 5, 10 g of polyoxypropylene triol and 10 g of polyoxypropylene diol were used, and as a polyfunctional compound having reactivity with a hydroxyl group, 20 g of hexamethylene diisocyanate was used. As tubes serving as the tubular clad material 3, two FEP tubes, of which respective size was, length 0.6 m, outer diameter 3.0 mm, and inner diameter 2.6 mm, were used. The mixture of the above core material 5 was filled in the tubular clad materials 3. There was a cylindrical shape of optical device 7, made of PMMA and having the size of 10 mm of length and 2.7 mm of outer diameter, and the both ends of the optical device 7 were inserted into these tubular clad materials 3, respectively filled with the above liquid core material 5, for the depth of about 5 mm. They were hardened by heat at 100° C., and thereafter, two ends of the light transmitting material 1, not the ends into which the optical device, 7 had been inserted, were cut, whereby the light transmitting material 1, having the length of 1 m and being connected to the optical device 7, could be obtained.

EXAMPLE 13

As illustrated in FIG. 14, as a polymer polyol serving as the core material 5, 12 g of polyoxypropylene triol and 12 g of polyoxypropylene diol were used, and as a polyfunctional compound having reactivity with a hydroxyl group, 13 g of Cosmonate NBDI (manufactured by Mitsui Takeda Chemicals, Inc.) was used. As tubes serving as the tubular clad material 3, two FEP tubes, of which respective size was, length 0.6 m, outer diameter 3.0 mm, and inner diameter 2.6 mm, were used. The mixture of the above core material 5 was filled in the tubular clad materials 3. There was a cylindrical shape of optical device 7, made of PMMA and having the size of 10 mm of length and 2.7 mm of outer diameter, and the both ends of the optical device 7 were inserted into these tubular clad materials 3, respectively filled with the above liquid core material 5, fir the depth of about 5 mm. They were hardened by heat at 100° C., and thereafter, two ends of the light transmitting material 1, not the ends into which the optical device 7 had been inserted, were cut, whereby the light transmitting material 1, having the length of 1 m and being connected to the optical device 7, could be obtained.

EXAMPLE 14

As illustrated in FIG. 14, as a polymer polyol serving as the core material 5, 10 g of polyoxypropylene triol and 10 g of polyoxypropylene diol were used, and as a polyfunctional compound, having reactivity with a hydroxyl group, having isocyanurate bond, 20 g of Coronate HX (manufactured by Nippon Polyurethane Industry Co., Ltd.) was used. As tubes serving as the tubular clad material 3, two FEP tubes, of which respective size was, length 0.6 m, outer diameter 3.0 mm, and inner diameter 2.6 mm, were used. The mixture of the above core material 5 was filled in the tubular clad materials 3. There was a cylindrical shape of optical device 7, made of PMMA and having the size of 10 mm of length and 2.7 mm of outer diameter, and the both ends of the optical device 7 were inserted into these tubular clad materials 3, respectively filled with the above liquid core material 5, for the depth of about 5 mm. They were hardened by heat at 100° C., and thereafter, two ends of the light transmitting material 1, not the ends into which the optical device 7 had been inserted, were cut, whereby the light transmitting material 1, having the length of 1 m and being connected to the optical device 7, could be obtained.

EXAMPLE 15

As illustrated in FIG. 14, as a polymer polyol serving as the core material 5, 20 g of polyoxypropylene triol was used, and as a polyfunctional compound having reactivity with a hydroxyl group, having isocyanurate bond, 20 g of Coronate HX (manufactured by Nippon Polyurethane Industry Co., Ltd.) was used. As tubes serving as the tubular clad material 3, two FEP tubes, of which respective size was, length 0.6 m, outer diameter 3.0 mm, and inner diameter 2.6 mm, were used. The mixture of the above core material 5 was filled in the tubular clad materials 3. There was a cylindrical shape of optical device 7, made of PMMA and having the size of 10 mm of length and 2.7 mm of outer diameter, and the both ends of the optical device 7 were inserted into these tubular clad materials 3, respectively filled with the above liquid core material 5, for the depth of about 5 mm. They were hardened by heat at 100° C., and thereafter, two ends of the light transmitting material 1, not the ends into which the optical device 7 had been inserted, were cut, whereby the light transmitting material 1, having the length of 1 m and being connected to the optical device 7, could be obtained.

COMPARATIVE EXAMPLE 8

Two commercial light transmitting materials, each of which core material and clad material were both made of PMMA plastic material, and each of which length was 0.5 m and outer diameter was 3.0 mm, was provided. These light transmitting materials were connected, by using a commercial adhesive, with a cylindrical shape of optical device, made of PMMA and having the size of 10 mm of length and 3.0 mm of outer diameter. Thus the light transmitting material, having the length of 1 m and being connected to the optical device, could be obtained.

COMPARATIVE EXAMPLE 9

As a core material, a commercial two-liquid mixture type of polyorgano siloxane was used. As tubes serving as the tubular clad material, two FEP tubes, of which respective size was length 0.6 m, outer diameter 3.0 mm, and inner diameter 2.6 mm, were used. The mixture of the above core material was filled in the tubular clad materials. There was a cylindrical shape of optical device, made of PMMA and having the size of 10 mm of length and 2.7 mm of outer diameter, and the both ends of the optical device were inserted into these tubular clad materials, respectively filled with the above liquid core material, for the depth of about 5 mm. They were hardened by heat at 100° C., and thereafter, two ends of the light transmitting material, not the ends into which the optical device had been inserted, were cut, whereby the light transmitting material, having the length of 1 m and being connected to the optical device, could be obtained

COMPARATIVE EXAMPLE 10

As a polymer polyol serving as the core material, 10 g of polyoxypropylene triol and 10 g of polyoxypropylene diol were used, and as a polyfunctional compound having reactivity with a hydroxyl group, 20 g of hexamethylene diisocyanate was used. As a tube serving as the tubular clad material, an FEP tube, of which size was, length 0.6 m, outer diameter 3.0 mm, and inner diameter 2.6 mm, was used. The mixture of the above core material was filled in the tubular clad material, and hardened by heat at 100° C. Thereafter, the both ends were cut, whereby the light transmitting material, of which length was 0.5 m, could be obtained. There were two light transmitting materials obtained by the above method, which were connected, by using a commercial adhesive, with a cylindrical shape of optical device, made of PMMA and having the size of 10 mm of length and 3.0 mm of outer diameter. Thus the light transmitting material, having the length of 1 m and being connected to the optical device, could be obtained For the purpose of estimating the properties of the light transmitting material according to examples 12, 13, 14 and 15, the following experiments were conducted.

Connecting Strength:

One end of the light transmitting material 1, having the length of 100 mm and including the optical device 7, was fixed to be in the horizontal state, at which a weight was suspended, and the state of contact face was examined. The result is as per shown in FIG. 12.

Light Transmitting Properties:

The light volume of each sample was measured. For the purpose of measuring the light volume, first, the light emitted from a white LED was incident in one end of each sample, and then the light volume, emitted from the other end of each sample, by going through the connecting part, was measured by using an illuminometer. The result is as per shown in FIG. 13.

Figure 15:
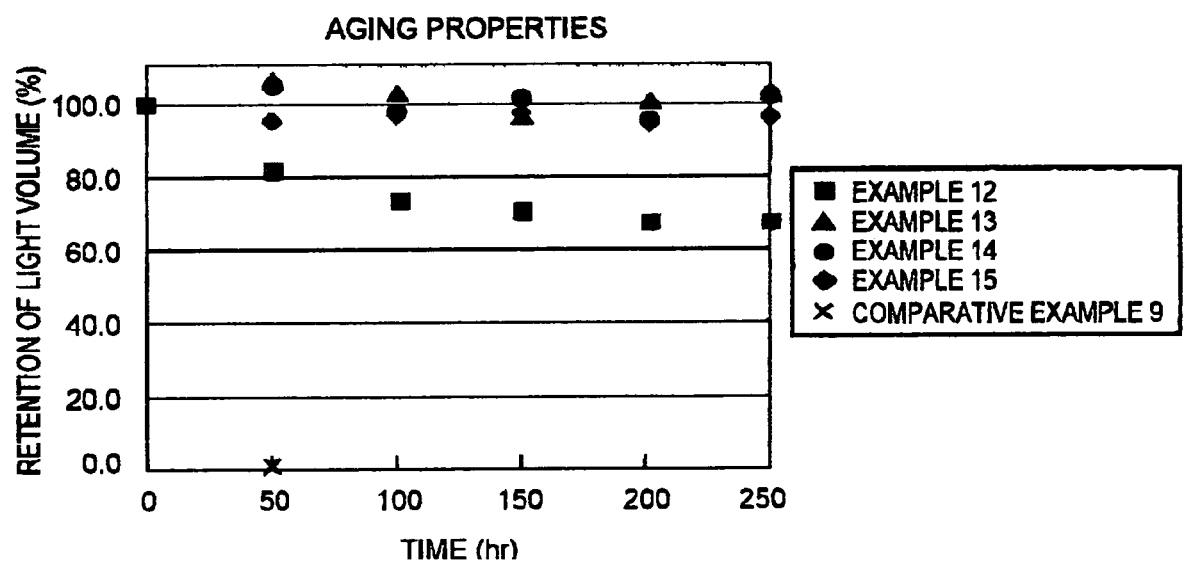
FIG. 15 is a graphic chart, showing a result of aging properties test according to the fourth embodiment of the present invention.

Aging Properties:

Each sample was left in the warm water at 60° C. for a predetermined time. Thereafter, the sample was collected and left at room temperature for 30 minutes. Then the aging properties as for the change of retention of light volume were measured in that state. The result is as per shown in FIG. 15.

First, as for the connecting strength, with regard to the comparative example 8, when a small force was applied to the sample, it was broken easily, and it is impossible to obtain the sufficient strength or practical use. On the other hand, with regard to the light transmitting materials according to the examples 12, 13, 14 and 15, none of them showed any change against the load, thus it is possible to obtain the sufficient strength for practical use.

Second, as for the light transmitting properties, each of the examples 12, 13, 14 and 15, in which the core material and the clad material were not positioned on the same plane, had the remarkable excellent light transmitting property as compared with the comparative example 10, in which the core material and the clad material were positioned on the same plane.

Third, as for the aging properties, according to the examples 12, 13, 14 and 15, there was almost no decrease of light volume in the warm water, and the excellent light transmission property could be stably maintained for a long period of time. In particular, the example 13, for which alicyclic polyisocyanate was used as the polyfunctional compound having reactivity with the hydroxyl group, serving as the core material and the examples 14 and 15, for which the polyfunctional compound having reactivity with the hydroxyl group, having isocyanurate bond was used an that serving as the core material, respectively indicated especially excellent aging properties. On the other hand, with regard to the comparative example 9 in which a polyorgano siloxane was used as the core material, the material become clouded after 50 hours, and it became impossible to measure the measurement of side face light emission volume.

This embodiment of the present invention is of course not limited to the examples as discussed above. Although the dispersed particles were not used in the above examples, when the dispersed particles are provided, for any of the light transmitting material or the optical device, or for the both of them, it is possible to provide the sample in which the side face light emission can be obtained at the dispersed particles portion.

According to this embodiment of the present invention as discussed above in detail, it is possible to a structure connecting light transmitting material and optical device, having small adverse effect of decrease of light volume or increase of transmission loss value at the connecting part, having practically sufficient connecting strength, and having almost no adverse effect of decrease of light volume or increase of transmission loss value under high temperature and high humidity or in the warm water.

INDUSTRIAL APPLICABILITY

As above discussed, the present invention is useful as for the following points. First, it is possible to provide a light transmitting material suitable for, light signal transmission such as for in-vehicle wiring, mobile wiring and FA device wiring, optical sensors such as liquid surface level sensors or pressure sensors, image guides such as or endoscopes, light guides such as for decorative displays, home electric appliances, optical devices, outdoor signages, etc., and also it is possible to provide a method for manufacturing such a light transmitting material. Second, it is possible to provide a light transmitting material (light scattering material), which can be formed and placed at an arbitrary position easily, because of the soft and flexible property even if the diameter is increased, which has no risk of being damaged because of the good impact resistance, which has almost no adverse effect of decrease of side face light emission volume under high temperature and high humidity or in the warm water, and which can stably maintain an excellent side face light emission property for a long period of time, and it is also possible to provide a method for manufacturing such a light transmitting material (light scattering material). Third, it is possible to provide a structure connecting light transmitting material and optical device, having small adverse effect of decrease of light volume or increase of transmission loss value at the connecting part, having practically sufficient connecting strength, and having almost no adverse effect of decrease of light volume or increase of transmission loss value under high temperature and high humidity or in the warm water.

The invention claimed is:

1. A light transmitting material comprising:
   a tubular clad material; and
   an amorphous corn material incorporated in said tubular clad material and having a higher refractive index than that of said tubular clad material,
   wherein said amorphous core material comprises a polymer non-fluidized by the polymerization of a polymer polyol and a polyfunctional compound having reactivity with a hydroxyl group,
   wherein said polymer consists essentially of said polymer polyol and said polyfunctional compound having reactivity with said hydroxyl group, said polyfunctional compound having reactivity with said hydroxyl group comprising a functional group derived from an isocyanate group, including an isocyanurate bond, and
   wherein said polymer polyol comprises at least one of polyoxypropylene triol and polyoxypropylene diol.

2. The light transmitting material as claimed in claim 1, wherein said amorphous core material at least partially incorporates a gel material.

3. The light transmitting material as claimed in claim 1, further comprising:
   dispersed particles in said amorphous core material.

4. The light transmitting material as claimed in claim 3, wherein said particles comprise the diameter of not more than 50 μm.

5. The light transmitting material as claimed in claim 3, wherein said dispersed particles are uniformly dispersed in said amorphous core material.

6. A structure connecting a light transmitting material according to claim 1 and an optical device, wherein a contact face of said amorphous core material of said light transmitting material with a core material of said optical device is covered by said tubular clad material of said light transmitting material, and
   wherein a difference in refractive index from said amorphous core material of said light transmitting material to said core material of said optical device is within +/−0.1.

7. The light transmitting material as claimed in claim 1, wherein said amorphous core material, comprising the ingredients of at least said polymer comprising said polymer polyol and said polyfunctional compound having reactivity with said hydroxyl group, at least partially incorporates a gel material.

8. The light transmitting material as claimed in claim 1, further comprising:
   dispersed particles in said amorphous core material.

9. The light transmitting material as claimed in claim 1, wherein said polymer polyol comprises polyoxypropylene trial and polyoxypropylene diol.

10. The light transmitting material as claimed in claim 1, wherein said polymer polyol comprises polyoxypropylene triol.

11. The light transmitting material as claimed in claim 1, wherein said polyfunctional compound having reactivity with said hydroxyl group comprises at least one of hexamethylene diisocyanate, isocyanurate modified hexamethylene diisocyanate and norbornane diisocyanate.

12. A light transmitting material comprising:
    a tubular clad material; and
    an amorphous core material incorporated in said tubular clad material and having a higher refractive index than that of said tubular clad material,
    wherein said amorphous core material comprises a polymer non-fluidized by the polymerization of a polymer polyol and a polyfunctional compound having reactivity with a hydroxyl group,
    wherein said polymer consists essentially of said polymer polyol and said polyfunctional compound having reactivity with said hydroxyl group, said polyfunctional compound having reactivity with said hydroxyl group comprises a functional group, derived from an isocyanate group, and
    wherein said polymer polyol comprises at least one of polyoxypropylene triol and polyoxypropylene diol.

13. The light transmitting material as claimed in claim 1, wherein said amorphous core material, comprising the ingredients of at least said polymer comprising said polymer polyol and said polyfunctional compound having reactivity with said hydroxyl group, at least partially incorporates a gel material.

14. The light transmitting material as claimed in claim 12, wherein said amorphous core material, comprising the ingredients of at least said polymer comprising said polymer polyol and said polyfunctional compound having reactivity with said hydroxyl group, at least partially incorporates a gel material.

15. The light transmitting material as claimed in claim 12, wherein said amorphous core material, comprising the ingredients of at least said polymer comprising said polymer polyol and said polyfunctional compound having reactivity with said hydroxyl group, at least partially incorporates a gel material.

16. The light transmitting material as claimed in claim 12, further comprising:
    dispersed particles in said amorphous core material.

* * * * *